No. 634,928. Patented Oct. 17, 1899.
J. F. WHERRY.
BIRD WHISTLE.
(Application filed Feb. 17, 1899.)
(No Model.)
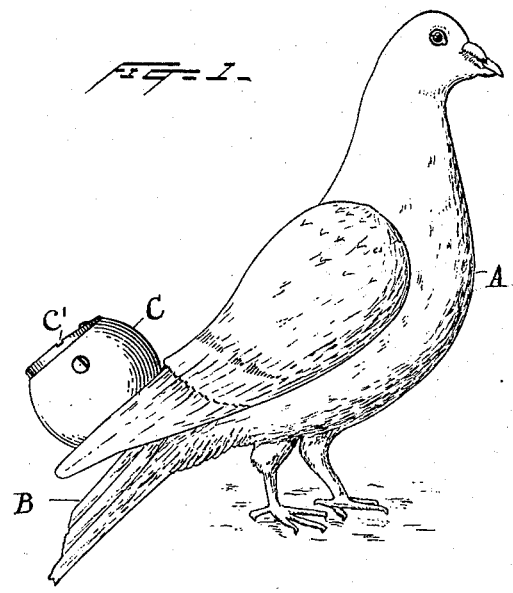
Fig. 1.
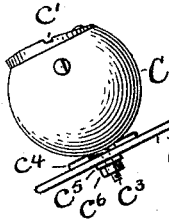
Fig. 2.
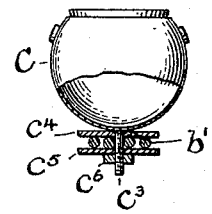
Fig. 3.
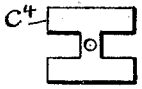
Fig. 4.
WITNESSES
Norris H. Clark.
Emma H. Finlayson.
INVENTOR
J. Fred. Wherry,
By
William M.
ATT'Y
THE NORRIS PETERS CO., PHOTO-LITHO., WASHINGTON, D. C.

UNITED STATES PATENT OFFICE.

JOHN FRED. WHERRY, OF RED BANK, NEW JERSEY.

BIRD-WHISTLE.

SPECIFICATION forming part of Letters Patent No. 634,928, dated October 17, 1899.

Application filed February 17, 1899. Serial No. 705,772. (No model.)

*To all whom it may concern:*

Be it known that I, JOHN FREDERICK WHERRY, a citizen of the United States, and a resident of Red Bank, in the county of Monmouth and State of New Jersey, have invented a certain new and useful Combined Identification Device, Message-Carrying Clamp, and Bird-Whistle, of which the following is a specification.

This invention has for its object to provide a whistle so constructed as to be adapted to be secured to a bird of rapid flight and to operate to make such a sound as will enable the bird to be identified.

In carrying out this invention a whistle is constructed and shaped in such a way that it will be carried on the upper side of the bird on its tail and near its body and by the rapid flight of the bird will be caused to emit a sufficient sound to identify the bird.

In illustrating the use of the invention it is shown in the accompanying drawings as used with a pigeon.

Figure 1 shows the whistle attached to a pigeon ready for use. Fig. 2 is a side view showing the means of attachment to the tail. Fig. 3 is a sectional view of the device in Fig. 2. Fig. 4 embraces detailed views of the upper and lower plates used in clamping the whistle to the bird's tail.

The pigeon is indicated by A, and its tail by B.

C is the whistle, which is made of some very thin material—such as papier-mâché, aluminium, or wood—and consists of a large sounding-chamber about two and one-half inches in diameter and preferably substantially spherical in shape. At the top of the whistle there is provided a transverse slit or mouthpiece $C'$ for the admission of air, which is so placed as to face forward toward the head of the bird when the whistle is in position. Beneath the slit $C'$ is a smaller slit $c'$, and on each side of the whistle, just below the top, there is a slit $c^2$ somewhat larger than the slit $c'$. By this arrangement of slits the air rushing through the same by the rapid flight of the bird the desired sound will be produced.

To secure the whistle to the bird in its proper position suitable means are provided at the bottom of the whistle for fastening the latter to the tail-feathers of the bird. This means, for example, preferably consists of a rod $c^3$, projecting from the whistle and screw-threaded at its end. A plate $c^4$ is provided with a hole drilled through it for the passage of the rod $c^3$. The plate $c^4$ is mounted on the rod $c^3$ between the whistle and the tail-feathers $b'$. $c^5$ is an under plate, which is slightly narrower than the space between the flanges of the plate $c^4$. The plates and whistle are clamped to the tail of the bird by means of a nut $c^6$ on rod $c^3$. It is readily seen that the several parts may be firmly clamped to the adjacent stems and the tail-feathers near the body of the bird.

A whistle so constructed and placed has been found to be effective in use and to emit sound, which, when the bird is in full flight, may be heard for over a mile.

It is understood that the exact form of the whistle herein shown and described is not strictly adhered to, as it may be modified so long as it can be effective and also to give a variation in sound.

The bird can be identified by an accustomed ear by the sound of its whistle, which in the case of homing or carrier pigeons becomes valuable in tracing the birds or to distinguish them during their flight.

The use of the whistle as a novelty or for amusement is apparent.

What I claim is—

1. A whistle to be secured to birds of rapid flight, composed of a comparatively large sounding-chamber, provided at its top with an aperture facing forward to receive the wind, and other apertures located in said whistle, and means located at the bottom of said whistle for securing said whistle to the tail-feathers of a bird on the upper side of the tail adjacent to the body of said bird, as and for the purposes set forth.

2. A whistle to be secured to the upper side of the tail of a bird of rapid flight, adjacent to its body, composed of a comparatively large sounding-chamber, substantially spherical in shape, and having at its top a transverse slit which faces toward the head of the bird, and smaller slits adjacent to said transverse slits, and a projection extending from the bottom of said whistle, with clamping-plates mounted on said projection and adapted to clamp the tail-feathers of the bird, and means for clamping and securing said plates to said tail-feathers, as and for the purposes set forth.

Signed at Red Bank, county of Monmouth and State of New Jersey, this 15th day of February, 1899.

J. FRED. WHERRY.

Witnesses:
S. W. PARMENTIER,
D. W. WILLGUSS.